(12) United States Patent
Blyler, Jr. et al.

(10) Patent No.: US 6,361,219 B1
(45) Date of Patent: Mar. 26, 2002

(54) END FINISHING OF PLASTIC OPTICAL FIBERS USING LASER ABLATION

(75) Inventors: Lee L. Blyler, Jr., Basking Ridge; Richard James Coyle, Jr., Lawrenceville, both of NJ (US); Gary J. Grimes, Birmingham, AL (US); Anthony Joseph Serafino, Cranbury, NJ (US); Charles J. Sherman, Westminster, CO (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/363,542

(22) Filed: Jul. 29, 1999

(51) Int. Cl.[7] ............... G02B 6/00; G02B 6/36
(52) U.S. Cl. ............... 385/85
(58) Field of Search ............... 385/85, 88, 37, 385/38, 147; 451/42, 43; 65/385, 386, 387, 483, 484

(56) References Cited

U.S. PATENT DOCUMENTS

| | | | |
|---|---|---|---|
| 4,544,231 A | * 10/1985 | Peterson | 385/85 |
| 4,715,876 A | * 12/1987 | Osaka et al. | 65/385 |
| 4,770,653 A | * 9/1988 | Shturman | 604/21 |
| 5,026,411 A | * 6/1991 | Coyle, Jr. et al. | 65/4.21 |
| 5,101,090 A | 3/1992 | Coyle, Jr. et al. | |
| 5,130,512 A | 7/1992 | Coyle, Jr. et al. | |
| 5,143,531 A | * 9/1992 | Kramer | 65/385 |
| 5,287,426 A | * 2/1994 | Shahid | 385/85 |
| 5,395,362 A | 3/1995 | Sacharoff et al. | |
| 5,421,928 A | 6/1995 | Knecht et al. | |
| 5,668,902 A | * 9/1997 | Kurata | 385/38 |

FOREIGN PATENT DOCUMENTS

| | | |
|---|---|---|
| EP | 0 393 601 A2 | 4/1990 |
| EP | 0 393 601 A3 | 4/1990 |
| JP | 59189301 | 10/1984 |
| WO | WO 97/48995 | 12/1997 |

OTHER PUBLICATIONS

Znotins, Thomas A.; Poulin, Darcy; Reid, John, Excimer Lasers: On Emerging Technology in Materials Processing, *Laser Focus/Electro–Optics*, (May, 1987), pp. 54–70.

* cited by examiner

*Primary Examiner*—Akm E. Ullah

(57) ABSTRACT

Finishing an end of a plastic optical fiber by ablating the end of the plastic optical fiber by utilizing an Excimer laser so that the end of the optical fiber can be used in a optical connector. A high powered ultraviolet beam of light from the laser is absorbed by the end of the fiber and ablates the first few microns of the end face of the fiber. This process removes residual cracks and fissures to flatten the end of the fiber for use in the optical connector. The optical fiber is then ready to make a low loss interface with a source, a detector, or another optical fiber.

11 Claims, 2 Drawing Sheets

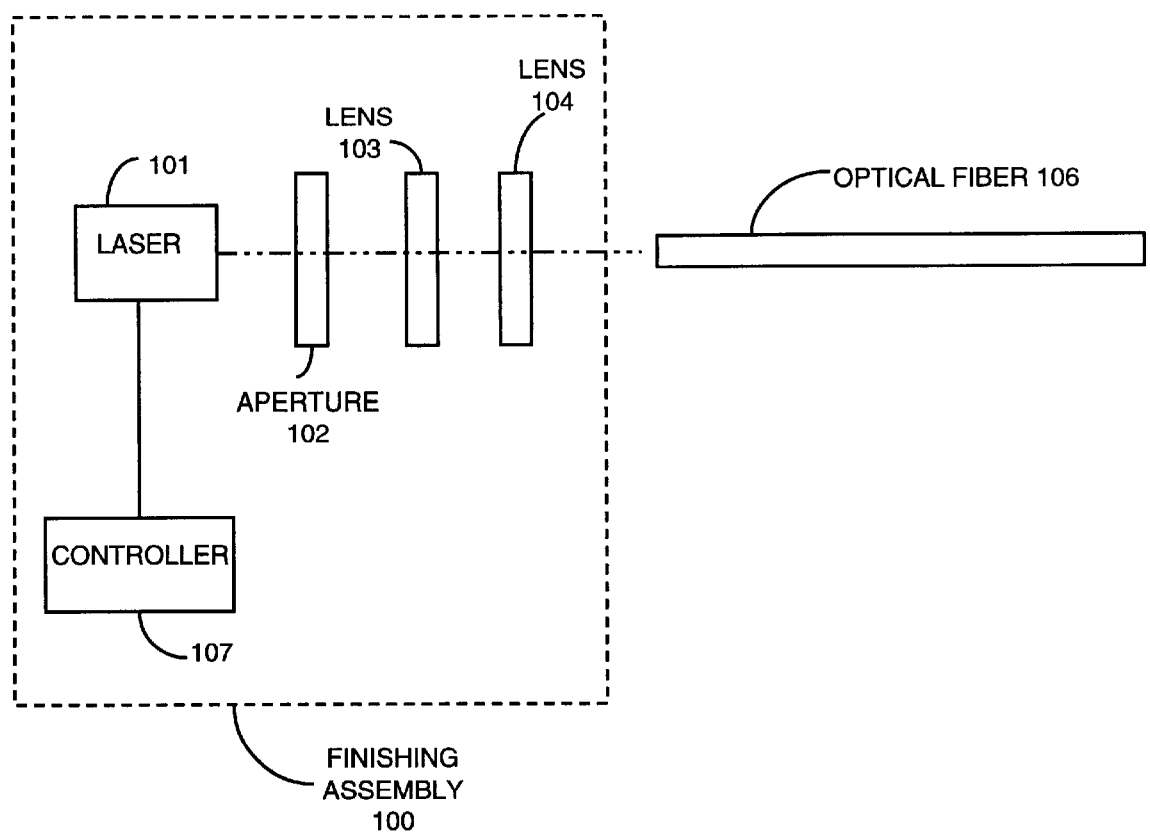

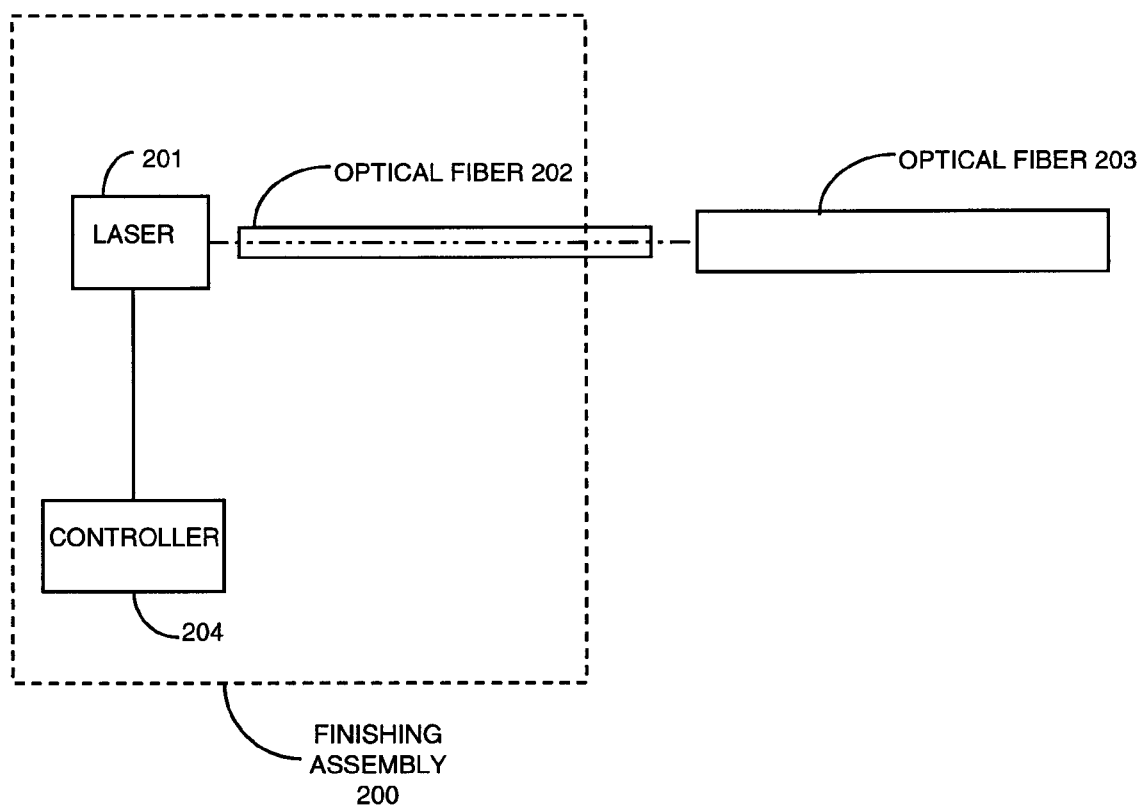

END FINISHING OF PLASTIC OPTICAL FIBERS USING LASER ABLATION

TECHNICAL FIELD

The present invention relates to the utilization of plastic optical fiber, and, more particularly, to the finishing of an end of a plastic optical fiber for insertion into an optical connector.

BACKGROUND OF THE INVENTION

Optical plastic fibers are in general easy to work with and are economical. An ongoing problem with the utilization of plastic optical fibers has been the problem of finishing the ends of a plastic optical fiber before or after insertion into an optical connector. The prior art finishing techniques have yielded connectors with a high insertion loss. These losses are typically in the 1.5 dB to 2.0 dB range. These insertion losses are high. For example, multimode connectors made with silica fibers are typically less than 0.5 dB. Within the prior art, the finishing of ends of plastic optical fibers in the field and the manufacturing environment have utilized two or three different grits of optical polishing paper to polish the end of the optical fiber. The utilization of optical polishing paper has resulted in the high insertion losses previously mentioned. Also within the prior art, another method is used to finish the ends of plastic optical fibers. This other method is referred to as hot plate end finishing. The hot plate end finishing method typically results in losses in the 1.5–2.0 dB range.

SUMMARY OF THE INVENTION

A departure in the art is achieved by an apparatus and a method for finishing an end of a plastic optical fiber by ablating the end of the plastic optical fiber by utilizing an Excimer laser. A high powered ultraviolet beam of light from the laser is absorbed by the end of the fiber and ablates the first few tens of microns of the fiber. This process removes material containing residual cracks and fissures to flatten the end of the fiber. The optical fiber is then ready to make a low loss interface with a source, a detector, or another optical fiber.

Other and further aspects of the present invention will become apparent during the course of the following description and by reference to the accompanying drawing.

BRIEF DESCRIPTION OF THE DRAWING

Referring now to the drawing:

FIG. 1 illustrates an apparatus for finishing the end of an optical fiber in accordance with a first embodiment of the invention; and FIG. 2 illustrates an apparatus for finishing the end of an optical fiber in accordance with a second embodiment of the invention.

DETAILED DESCRIPTION

In accordance with a first embodiment of the invention, FIG. 1 illustrates finishing assembly 100 that finishes the end of optical fiber 106 by ablating the end of optical fiber 106 to remove material containing cracks and fissures. The cracks and fissures resulted from the initial cutting of the end of optical fiber 106. Laser 101 is advantageously a Questek Model 2660, Excimer laser, that when operated advantageously at a wavelength of 248 nanometers (nm) ablates the end of optical fiber 106. Further, one skilled in the art could readily envision that wavelengths within a range of 193 to 353 nanometers could also be utilized.

The ablation results from the absorption of the ultraviolet light from laser 101. The energy is only absorbed within the first micron of the end face of optical fiber 106. This absorption of energy in the first micron causes an induced instantaneous removal of material which is called ablation. Approximately, 1 micron of fiber is removed for each 3–5 pulses from the laser. A very precise layer of material is removed with each pulse of laser 101. Advantageously, the plastic fiber may be fabricated from polymethyl methacrylate (PMMA), a poly(butenyl vinyl ether), or a polycarbonate material. Advantageously, at least 80 microns of material is removed from the end of the plastic optical fiber to flatten it for optical transmission.

In FIG. 1, a first embodiment of the invention is illustrated. In finishing assembly 100, aperture 102 and lenses 103 and 104 are utilized to focus the light being emitted by laser 101 onto the end of optical fiber 106. The light is focused so that the light overlaps optical fiber 106 and is centered on the center of optical fiber 106. The overlapping is such that there is a 0.5 decibel difference in light intensity from the center of optical fiber 106 to the outer edge.

In FIG. 2, a second embodiment of the invention is illustrated. Within finishing assembly 200, optical fiber 202 is utlilized to perform mode mixing on light being emitted from laser 201. The resulting light being projected from optical fiber 202 onto optical fiber 203 has an even intensity across the end of optical fiber 203 so that the end of optical fiber 203 is evenly ablated. Optical fiber 202 is coiled into 10 coils with each coil being 10 inches in diameter. In addition, the end sections of optical fiber 202 that interface to laser 201 and optical fiber 203 are straight and sufficiently long to allow easy interfacing. Advantageously, optical fiber 202 has a quartz core of 300 microns.

It is to be understood that the above-described embodiment is merely illustrative of the principles of the invention and that other arrangements may be devised by those skilled in the art without departing from the spirit and scope of the invention. Although an excimer laser has been illustrated, another suitable radiation source could also be used. Other finishing assemblys can be envisioned by those skilled in the art.

What is claimed is:

1. A method for finishing the end of an optical fiber for utilizing in an optical connector, comprising the steps of:

providing an optical fiber having a cut end;

generating light from an optical source;

forming the generated light onto the cut end of the optical fiber; and ablating the cut end of the optical fiber by the formed light removing residual cracks and fissures from the cut end to finish the end of the optical fiber for utilization in the optical connector.

2. The method of claim 1 wherein the step of forming comprises the steps of focusing the generated light with one or more lens; and masking the focused light with an aperture.

3. The method of claim 2 wherein the optical source is a laser.

4. The method of claim 3 wherein the generated light has a wavelength in a range of 193 to 353 nanometers.

5. The method of claim 1 wherein the step of forming comprises the step of performing mode mixing of the light.

6. The method of claim 5 wherein the step of mode mixing comprises the step of transmitting the generated light through glass optical fiber.

7. The method of claim 6 wherein the optical source is a laser.

8. The method of claim 7 wherein the generated light has a wavelength in a range of 193 to 353 nanometers.

9. An apparatus for performing the method of claim 1.

10. An apparatus for performing the method of claim 2.

11. An apparatus for performing the method of claim 5.

\* \* \* \* \*